CARBURETOR INLET PRESSURE Vs ALT. AT
SOME CONSTANT MANIFOLD PRESSURE & R.P.M.

POWER OR PILOTS CONTROL LEVER POSITION

INVENTORS
FRANK C. MOCK
JAY A. BOLT

Aug. 30, 1949.  F. C. MOCK ET AL  2,480,758
CONTROL MECHANISM FOR SUPERCHARGED AIRCRAFT ENGINES
Filed Jan. 10, 1944  4 Sheets-Sheet 4

INVENTORS
FRANK C. MOCK
JAY A. BOLT
BY
W. A. Gebhardt

Patented Aug. 30, 1949

2,480,758

UNITED STATES PATENT OFFICE 2,480,758

CONTROL MECHANISM FOR SUPERCHARGED AIRCRAFT ENGINES

Frank C. Mock and Jay A. Bolt, South Bend, Ind., assignors to Bendix Aviation Corporation, South Bend, Ind., a corporation of Delaware Application January 10, 1944, Serial No. 517,622

35 Claims. (Cl. 60—13)

This invention relates to controls for aircraft power units utilizing one or more superchargers or supercharging stages; it is adapted primarily although not necessarily for use with engines employing one or more superchargers wherein at least one is of the turbo type, preferably driven directly or indirectly by the exhaust gases of the engine. In the drawings, the improved control is shown in coordinated relation with a mechanically or engine-driven supercharger and a turbo booster or supercharger arranged in series therewith and functioning as an auxiliary, and while certain novel and advantageous results are attained with such arrangement, it will be obvious that our improved control system may be adapted for power units employing turbo supercharging exclusively, or a combination of mechanical and turbo or exhaust-driven or controlled compressors or superchargers.

A variable datum type of boost or supercharger control is used, and the boost control datum may be set by means of a power control lever in the pilot's compartment, which lever may at the same time set a propeller pitch governor, to thereby correlate the engine speed with the charging pressure and prevent both the charging pressure and the developed horsepower from exceeding permissible or safe values.

The engine-driven supercharger applies the required charging pressure to the intake manifold posterior to the throttle while the turbo supercharger applies a coordinated carburetor inlet pressure to the induction passage anterior to the throttle. The variable datum control includes a device such as a bellows or aneroid influenced by manifold pressure and another bellows or aneroid under the infence of carburetor inlet pressure, said aneroids being provided with datum springs variably loaded by cams mounted on a shaft controlled by the pilot's control lever. One of these cams sets the intake manifold pressure datum which is automatically maintained by a servo-motor controlling the engine throttle, while the other cam sets the carburetor inlet pressure datum which is automatically maintained by an aneroid-controlled switch having an electrical connection with a reversing motor functioning to variably position a waste gate located in the exhaust conduit. Since an exhaust driven turbo compressor tends generally to balance the intake pressure rise across the turbo driven blower against the exhaust pressure drop across the turbine blades, any fixed position of the control maintains a substantially constant carburetor deck absolute pressure viz., pressure in the immediate region of the carburetor inlet, and by properly coordinating the datum cams, any desired ratio of intake manifold and carburetor deck pressure may be obtained. In one form of the invention a speed-control cam is mounted on the same shaft with the manifold-pressure and carburetor inlet pressure datum cams and coordinated therewith, thereby providing a predetermined schedule of intake manifold pressure, carburetor inlet pressure and engine R. P. M. at each setting of the power control lever; while in another form an independent speed control is provided and carburetor inlet pressure varies in relation to engine speed with variations in power lever settings.

The term "predetermined schedule" as used herein refers to a set of correlated values (which may be established by tests or based on engine characteristics) of manifold pressure, engine R. P. M. and carburetor inlet pressure to obtain specified power outputs. As is generally known, a given engine may develop the same power at a given engine R. P. M. and charging pressure as it does at a higher speed and lower pressure, or at a lower speed and a higher pressure, but the efficiency, engine cooling and other engine characteristics will vary. Thus, for a given engine, particular values of engine speed, charging pressure, and carburetor inlet pressure are better suited to producing a selected power output than are other values. With the proper data in hand as to the relative values of manifold pressure, speed and carburetor inlet pressure best suited to give any selected power output, the present control mechanism may be readily set to maintain this relationship or schedule.

Furthermore, a problem presents itself in view of the construction and operating characteristics of a turbo booster or supercharger. With a turbo booster or supercharger the control is usually initiated through regulation of the exhaust pressure on the turbo blades, and since exhaust pressure is a factor of engine efficiency, it is desirable to have a control which maintains the most effective charging pressure with a minimum of throttle loss and exhaust restriction. In the present instance the mechanical or engine-driven supercharger may be caused to apply the required pressure at the intake manifold up to a certain critical altitude, during which time the turbo booster may be caused to apply a predetermined auxiliary pressure on the air intake duct leading to the carburetor, or to remain substantially inactive or at an idling speed, and to automatically increase in speed when additional supercharging is required, with efficient utilization of exhaust pressure on the turbine driving rotor, the control being similarly effective when the plane moves from higher to lower altitudes.

The present invention therefore includes among its objects:

To provide an improved control for aircraft power units employing one or more superchargers or supercharging stages of the turbo type;

To provide an improved supercharger control for internal combustion engines for aircraft having a multi-step supercharging system which will maintain predetermined charging pressures at the intake manifold and at the inlet to the carburetor coordinated to produce the selected power output with a minimum of throttle loss;

To provide a variable datum type of multi-stage supercharger control particularly adapted for power units employing mechanical and turbo type superchargers in series;

To provide a power control for internal combustion engines of aircraft capable of automatically maintaining a predetermined schedule of charging pressure at the intake manifold, pressure at the intake to the carburetor, or carburetor deck pressure, and engine speed or R. P. M.;

To provide an improved control for supercharger systems utilizing a mechanically or engine-driven supercharger for the first or initial stage and a turbo-type supercharger for the succeeding stage or stages and wherein a variation in supercharger pressure from a predetermined schedule, resulting for instance from a change in engine speed, is compensated for by a change in the pressure rise across the turbo;

To provide a control of the type specified wherein the speed of the turbine is under accurate regulation at all times;

To provide a control for turbo superchargers arranged in a manner such that the turbine is maintained in a state of rotation during low power engine operation to thereby promote sensitivity and quick acceleration with a minimum of power loss in turbo operation;

To provide a convenient and simplified mechanical override for superchargers employing a plurality of supercharging steps or stages and particularly wherein at least one is of the turbo type;

To provide an improved electrical control for multistep superchargers;

And to generally improve and render more flexible and sensitive in operation supercharging controls for aircraft.

Many other objects and advantages will be readily apparent to one skilled in the art from the following description taken in connection with the appended drawings, in which.

Figure 1:
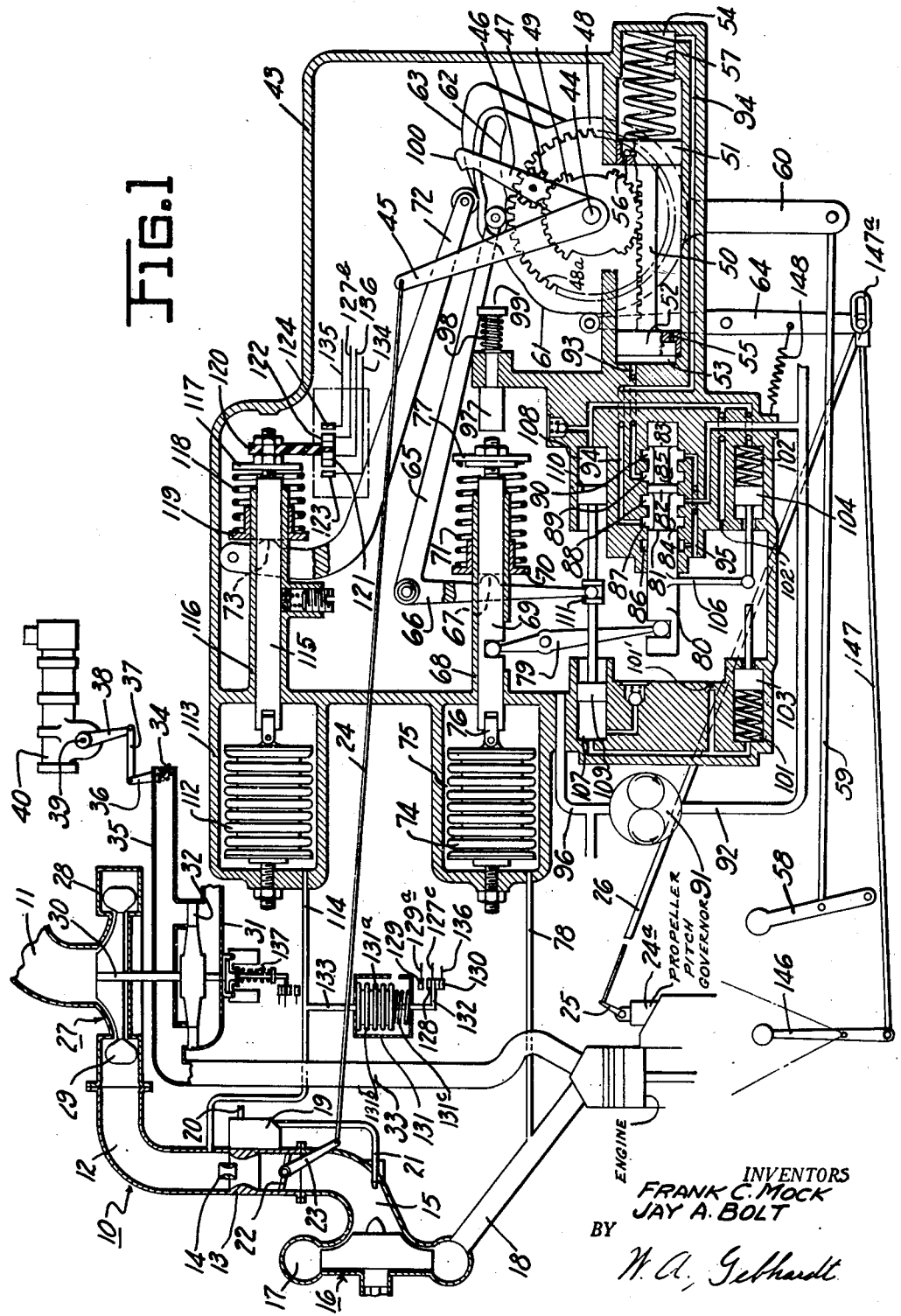
Figure 1 is a diagrammatic sectional view of a control unit in accordance with the invention.

With particular reference to Figure 1, there is shown an induction conduit 10 for an internal combustion engine having an air inlet or scoop 11, a section 12 leading to a main venturi 13 and a boost venturi 14, and a section 15 leading to the entrance of a supercharger 16 having an annular discharge ring 17 adapted to deliver air under pressure to intake manifold 18 which supplies the respective cylinders of the engine. The supercharger 16 as herein illustrated is of the mechanical driven type, the drive being taken from the engine crank shaft, cam shaft, or other rotating part and transmitted to the supercharger rotor through suitable gearing, indicated at 16a, Fig. 2. The supercharger as here shown is of the single speed type, but could obviously be of the multi-speed or multi-stage type. Fuel may be supplied to the engine by any desired fuel-feeding system, such as a carburetor 19 of the pressure feed type, an example of which is disclosed in Patent No. 2,361,227, issued to Frank C. Mock October 24, 1944, which carburetor receives fuel through pipe 20 and discharges it through nozzle 21.

A throttle 22 variably limits the quantity of air flowing through the induction passage to the cylinders of the engine and is controlled through lever 23 and link 24 by mechanism hereinafter described.

A propeller pitch governor, indicated generally at 24a, controls the pitch of the propeller blades, not shown, to thereby maintain the engine speed at a value determined by the position of lever 25 controlled through link 26 by mechanism to be described. The propeller pitch control may be of either the electric, hydraulic or other known type.

A turbo-type supercharger is generally indicated at 27 and includes an impeller casing 28 adapted to discharge into the induction conduit 10 and having an impeller 29 therein, the said impeller being secured on a shaft 30 which projects through a rotor casing 31 having a turbine or rotor 32 therein also secured on said shaft, the casing 31 constituting an extension of exhaust conduit 33 and being arranged to receive the exhaust discharge in whole or in part. The speed of rotation of the rotor 32 is determined by the position of a waste or blast gate 34 rotatably mounted in an extension 35 of the exhaust conduit 33 and provided with a lever 36 connected by means of link 37 with arm 38 driven from the armature shaft 39 (see Figure 2) of a motor 40, the latter being of the reversing type and provided with field coils 41 and 42 arranged in opposed relation so that when current is directed through coil 41 the armature rotates in a direction to close the waste gate 34 and when directed through coil 42 it rotates in the opposite direction to open the waste gate.

Figure 2:
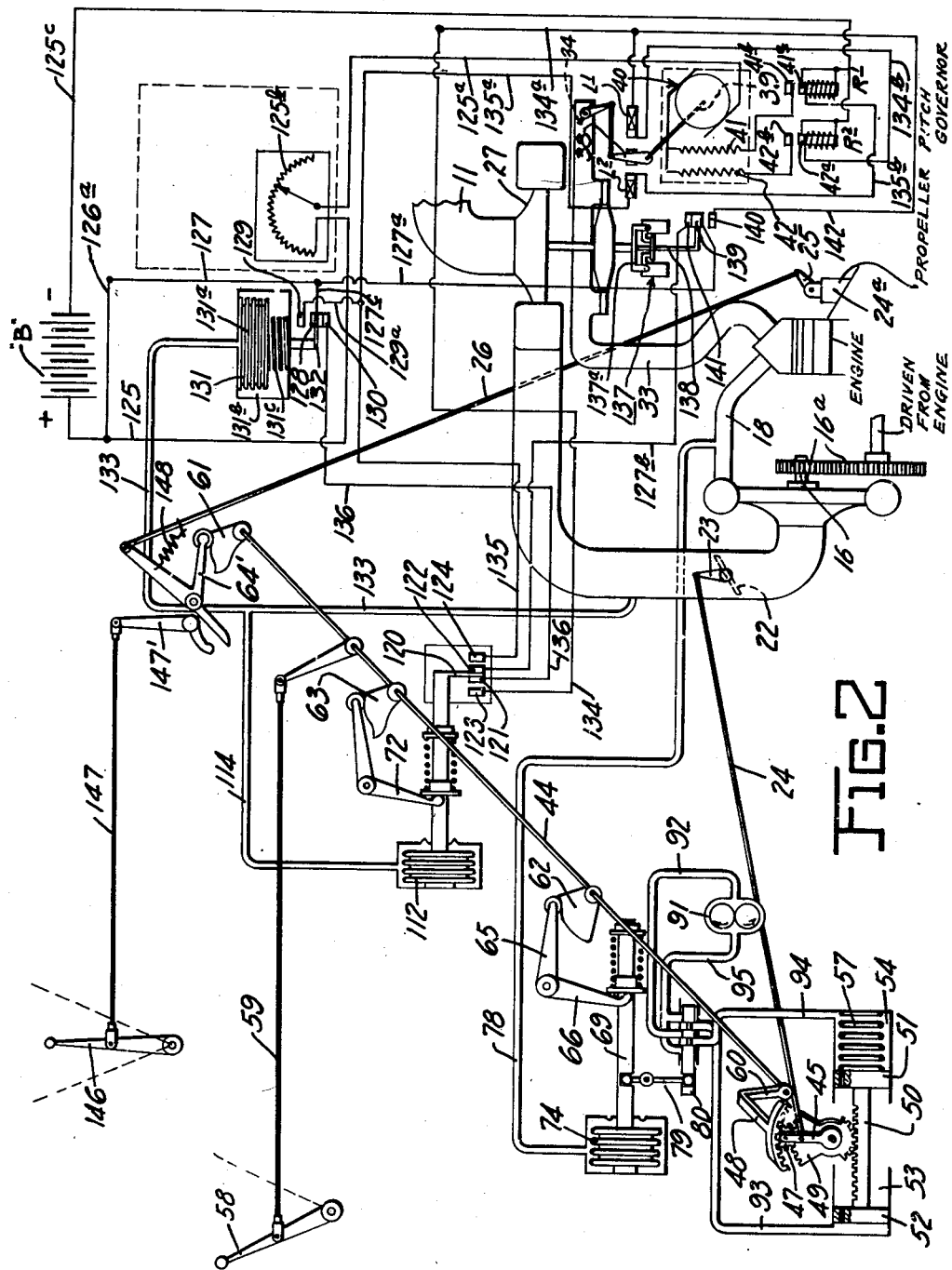
Figure 2 is a schematic diagram including the electric circuits and coacting switch mechanism of the control unit.

To prevent overrunning of the motor, limit switches $L^1$, $L^2$ may be located for contact by the arm 38, said switches being illustrated diagrammatically in Figure 2. Other equipment includes a pair of relays $R^1$, $R^2$, the latter being provided to avoid passing the motor current through the contact circuit and consequent heavy arcing across the points. Relays $R^1$, $R^2$ are provided with the usual solenoids and fixed contacts 41a, 42a and movable contacts 41b and 42b.

Means in the form of a power control unit is provided whereby the pilot, through a single lever 58, is enabled to have direct mechanical control of the supercharging pressure and propeller speed governor over a certain range of throttle actuation, whereupon the control becomes automatic. This power control unit has certain features in common with the control units illustrated in the copending applications of Frank C.

Mock, Serial No. 440,669 filed April 27, 1942, now Patent No. 2,453,651, and Serial No. 443,042 filed May 15, 1942, as will be rendered apparent from a comparison of the respective structures. Briefly, it comprises a casing 43 having a main shaft 44 rotatably mounted therein. A lever 45 is secured to the shaft exteriorly of the casing and is pivotally connected to link 24 operatively connected to the engine throttle. A second lever 46 having a spur gear or pinion 47 rotatably mounted thereon is also secured to shaft 44, whereby rotation of lever 46 rotates lever 45 and variably positions the throttle 22. A member 48, somewhat resembling a quadrant, is provided and has an internally-toothed segment or gear portion 48a in mesh with pinion 47, said member 48 being loosely mounted or otherwies supported for rotation on shaft 44. A gear 49 is also rotatably mounted on shaft 44 and has one segment in constant mesh with pinion 47 and another segment in constant mesh with a gear rack 50 forming a connection between two servo-motor pistons 51 and 52 slidably received in cylinders 54 and 53 and provided with small oil by-pass ports 55 and 56. A spring 57 urges the pistons to the left, corresponding to closed throttle position. The gears 47, 48 and 49 form a planetary spur gear train wherein counterclockwise movement of either or both gears 48 and 49 rotates lever 46, shaft 44 and lever 45 in a counterclockwise direction, and opens the throttle 22, and clockwise movement of said gears closes the throttle.

For controlling the power output of the engine, a control lever 58 is pivotally mounted in the pilot's compartment and is connected by link 59 with an arm 60 on the member 48, whereby the pilot is enabled to directly control the position of said latter member. The member 48 is provided with cams or cam surfaces 61, 62 and 63 adapted respectively, to vary and correlate engine speed, datum of the first supercharging step initiated through supercharger 16, and datum of the second step or auxiliary supercharger through turbo supercharger or booster 27. Cam 61 is engaged by roller or other type of follower on an arm of a pivoted lever 64, the other arm of which is connected by link 26 to arm 25 of the propeller pitch governor 24a; cam 62 is engaged by a roller or other type of follower on an arm 65 of a pivoted bell crank, the other arm 66 of which is provided with fingers 67 straddling a cylindrical guide 68 of a datum rod 69 and engaging a spring collar 70 slidably mounted on guide 68 for variably loading a boost control datum spring 71; and cam 63 is engaged by a roller or the like on the one end of a pivoted lever 72 having fingers 73 for variably loading the datum spring assembly of a turbo supercharge or boost control unit, to be described.

A sealed corrugated bellows 74, which may be partially evacuated if desired, is adjustably mounted at its left end in the wall of a chamber 75 and has its free end secured through a universal connection 76 to the left end of datum rod 69. The datum spring 71 prevents the bellows 74 from collapsing by reacting against spring retainer 77 threadedly received on rod 69 and locked in its adjusted position by a conventional lock nut or the like. The bellows 74 is subjected to engine charging pressure by means of a pressure-transmitting pipe or conduit 78 connecting chamber 75 to intake manifold 18

Movement of rod 69 is transmitted through a pivoted lever 79 to a servo-motor control valve or valve member 80 provided with lands 81, 82, 83 and grooves 84 and 85. The valve is slidably received in a cylinder having grooves 86, 87, 88, 89 and 90. The land 82 is somewhat narrower than groove 88, and in its neutral position is substantially centrally located relative to said groove; the lands 81 and 83 at such time just, or very nearly, seal grooves 86 and 90.

A pump 91, which may be either the main oil pump for the engine or a pump for an auxiliary hydraulic system, supplies oil through pipe or conduit 92 to the groove 88 of the servo-valve cylinder, and ducts 93 and 94 lead from the grooves 89 and 87 to the left and right-hand chambers 53 and 54 respectively, of the servo-motor. A drain duct 95 connects grooves 86 and 90 with the interior of casing 43 and a pipe or conduit 96 returns drain oil from the casing to pump 91.

In order to limit the supply of high pressure oil to cylinder 53 at such times as the throttle is wide open with the pistons 51 and 52 in an intermediate position, a servo-motor tripping device is provided and comprises a slidable stop 97 urged to the right by spring 98 and having a flange 99 adapted to be engaged by cam portion 100 of lever 46 as the latter approaches within a few degrees of its wide open throttle position. Movement of stop 97 upon further movement of lever 46 moves rod 69 to the left and valve 80 to the right, to thereby increasingly restrict and finally cut off communication through servo-valve 80 between oil supply passage 92 and duct 93 leading to servo-motor chamber 53.

In order to prevent hunting of the bellows actuated servo-valve 80, a pair of oppositely disposed cylinders 101, 102 are provided and have damping pistons 103, 104 slidably received therein, each piston being urged inwardly by a light spring and each having an extension adapted to closely approach the ball-shaped end of an arm 106 of servo-valve 80 when the latter is in its central position. Said cylinders are connected to the interior of casing 43 through restricted passages 101', 102' which limit the rate of inward travel of the pistons 103, 104. If the valve tends to hunt, arm 106 will successively engage the extensions of the pistons to thereby resist movement of the valve to the left or right of its equilibrium position. Since it is desirable to have the servo-valve 80 respond quickly to any change in the load on spring 71, a pair of cylinders 107, 108 are provided in fluid communication with cylinders 101, 102 and have pistons 109, 110 slidably received therein, said latter pistons having extensions secured to the end 111 of arm 66 so as to be actuated thereby. Upon movement of arm 66, pistons 109, 110 displace oil in cylinders 101, 102 and temporarily withdraw whichever of pistons 103, 104 would otherwise interfere with the desired rapid movement of valve 80.

For a more detailed description of the foregoing construction, reference may be had to Patent No. 2,453,651, heretofore noted.

For controlling the operation of the turbo-booster 27 and hence the inlet pressure to the carburetor in section 12 of induction conduit 10, there is provided a bellows or aneroid 112, preferably at least partially evacuated, which is adjustably mounted at one end in a chamber 113 connected to the air intake section 12 anterior of the carburetor by means of pressure-transmitting pipe 114. The free or movable end of bellows 112 is connected to the one end of a rod 115 slidable in guide sleeve 116 and having a spring retainer 117 adjustably secured thereon against which the one end of a carburetor intake pressure datum spring 118 abuts, a sleeved collar 119 being slidably mounted on the outer end of sleeve 116 in abutting engagement with the opposite end of said spring. The fingers 73 of lever 72 normally engage the collar 119 and variably load the spring 118, depending upon the position of cam 63 as determined by the setting of the quadrant-like member 48 through the pilot's control lever 58.

The right-hand extremity of rod 115 is extended beyond sleeve 116 and is provided with a switch arm 120 carrying a pair of contacts 121, 122 adapted to be moved into alternate engagement with adjacent contacts 123, 124, depending upon the direction of travel of rod 115. The contacts 121, 122, 123 and 124 are electrically connected to the waste or exhaust gate motor 40 through pressure reserve switch 131 and turbo speed governor 137 in a manner which will now be described.

By referring to Figure 2, it will be noted that a source of electric power such as a battery B of suitable potential is provided, and has the positive terminal thereof connected by wires 125, 125a with the positive brush of the waste gate motor 40 through speed adjusting rheostat 125b, the other terminal of the battery being connected by wire 125c with the fixed contacts of relays R¹, R². The positive terminal of the battery is also connected by wires 126a, 127, 127a to and through overspeed governor contacts (to be described) and thence by wire 127b to contact 122. A branch 127c of wire 127 leads to a contact 128 adapted to coact with one or the other of contacts 129 and 130 forming part of a pressure reserve switch 131, functioning to maintain a minimum turbo boost, or to at least maintain the turbo in idling operation during periods when the turbo boost is not required. In the example herein illustrated, pressure reserve switch 131 comprises a bellows 131a responsive to variations in pressure and mounted in chamber 131b suitably vented to the atmosphere. A spring 131c of predetermined capacity normally urges the bellows toward collapsed position. A switch rod 132 is secured to one end of the bellows for movement therewith and carries contact 128. The bellows is in pressure communication with the section 12 of the intake conduit 10 by means of pipe 133. This pressure reserve switch operates in response to a differential between atmospheric pressure and the pressure maintained at the inlet to the carburetor, or carburetor deck pressure in a manner which will be more fully hereinafter described.

Contact 123 connects by wires 134, 134a and 134b with the solenoid coil of relay R² through limit switch L¹; and contact 124 connects by wires 135, 135a and 135b with solenoid coil of relay R² through limit switch L². Contact 121 connects by wire 136 with contact 130 of the pressure reserve switch 131 and thence through contact 128 (when the latter is in engagement with contact 130) wires 127c, 127 and wire 126a with the battery. It will be seen that when pressure reserve switch contacts 128 and 130 are separated, the circuit is broken between the battery and contact 121 and the aneroid 112 can no longer act to open the waste gate 34; and when contact 128 engages 129, a circuit is closed between the battery and relay R' through wire 126a, 127, 127c, 129a, 135a, limit switch L² and wire 135b, whereupon contacts 41a, 41b close, thereby closing the motor circuit to coil 41 and the waste gate will move toward closed position. Normally contacts 128 and 130 are in engagement, separation occurring only in the event the pressure differential across bellows 131a drops to a predetermined value. The manner in which switch 131 operates will be more fully described in connection with the general operation of the control.

To limit the turbo to a safe maximum speed, an overspeed governor, generally indicated at 137, is provided and comprises conventional pivoted weights carried by a support 137a which in turn is secured on the turbo shaft 30. The governor weights act through centrifugal force to reciprocate a switch rod or like member 138 provided with contact 139 adapted to engage contact 141 when the turbo speed is below its maximum safe permissible value and to engage contact 140 when the turbo speed exceeds the maximum permissible value. When contact 139 is in engagement with 141, current may flow from the battery through wires 126a, 127, 127a, contacts 139, 141, and wire 127b to contact 122. If contact 122 is in engagement with contact 124, the current may then flow through wires 135, 135a and 135b to relay R¹ of reversing coil 41 to further close the waste gate 34, thus permitting control through aneroid switch 112; but should a predetermined maximum speed be attained, this circuit will be interrupted by the governor switch 131 and a circuit set up from the battery through wires 126a, 127, 127a, contacts 139, 140 and wires 142, 134b with the solenoid coil of relay R², energizing the solenoid of the latter and closing contacts 42a, 42b, thereby closing the motor circuit to reversing coil 42 and opening the waste gate until safe speed is resumed.

There may be instances when the pilot will desire engine speed in excess of that scheduled, as for example during cruising where an increased speed ratio with respect to manifold pressure and carburetor inlet pressure would result in more economical operation, or to obtain a low-pitch setting for ground travel, take off and landing. Accordingly, a convenient propeller override is provided consisting of a lever 146 which may be mounted in the pilot's compartment and connects by link 147 with lever 64, the latter being normally urged into contact with cam 61 by means of spring 148. In Figure 1, link 147 connects with lever 64 through lost-motion connection 147a, which permits the lever 64 free travel during automatic operation through the cam 61, but in the event it is desired to override the cam, lever 146 may be urged to the left, whereupon the cam follower carried by lever 64 may be advanced beyond the range of the cam 61. The lever 64, unless held in the override position, will automatically move back to normal automatic operation due to the action of spring 148. In Figure 2, the lever 64 is of bell-crank shape and is indicated at 64', and the link 147 connects therewith through the medium of override lever 147', which compares with the lost-motion connection 147a of Figure 1. The same results are obtained in this instance as in Figure 1.

In describing the operation of the control mechanism, any practical schedule of manifold pressure, carburetor inlet pressure and R. P. M. may be assumed, it being obvious that such schedules are governed by the characteristics of different types or makes of engines, and once the most efficient or effective schedule has been established by tests or otherwise, the datum cams and coacting parts may be set accordingly.

At sea level with the throttle closed and the engine idling, the pilot's control lever 58 will be in the extreme left-hand position and the cam followers of levers 65, 72 and 64 will be in engagement with the low portions of their respective cams, datum springs 71 and 118 being loaded but with moderate forces which are insufficient to prevent partial collapse of the bellows coacting therewith. Due to the collapsed state of bellows 74, the valve 80 is in its extreme right-hand position, whereby oil under pressure is transmitted from pipe 92 through the servo valve and passage 94 to the chamber 54, where it acts on piston 51 and together with the spring 57 holds the rack 50 in its extreme left-hand position, thus substantially locking the gear 49.

As lever 58 is gradually moved to the right, quadrant 48 will move in a counterclockwise direction, causing the pinion 47 to move in a similar direction around the gear 49, this movement of the pinion being transmitted through lever 46, shaft 44 and lever 45 to the throttle link 24, thereby opening the throttle. As the throttle opens the charging pressure acting on bellows 74 increases and tends to maintain the bellows in its collapsed state, but as lever 58 is moved further, the rise in cam 62 approaches and engages the follower of lever 65, thereby moving the fingers 67 to the right and increasing the load on spring 71 tending to expand bellows 74. The rise in cam 62 increases the spring load at a rate greater than the rate of increase of the pressure-collapsing force resulting from the manual opening of the throttle, whereby the spring force overcomes the pressure force and moves the rod 69 to the right and through lever 79 moves the servo-valve 80 to the left until the valve reaches its normal equilibrium position in which the land 82 is substantially centered relative to the groove 88. At this time the throttle is partially open and the machine is operating at a speed above normal idling but preferably less than the minimum values experienced during cruising. Through this range of movement of throttle lever 58, the pilot has a direct mechanical control over the throttle, the boost control being substantially inoperative although the turbo is rotating at a predetermined speed due to the action of the pressure reserve switch 131. This initial manually controlled throttle range is desirable since the engine manifold pressure at idling and near idling tends to be unstable and will result in hunting action of the boost control.

If lever 58 is now moved an additional amount beyond the range of direct throttle actuation, cam 62 through bell crank levers 65 and 66 and fingers 67 further load the spring 71 and move the rod 69 to the right and the servo-valve 80 to the left from the neutral or equilibrium position. Oil from pipe 92 is then transmitted through the servo-valve 80 and passage 93; and the chamber 54 is connected through the passage 94 and valve 80 to the passage 95 for returning oil to the casing 43. The high pressure oil forces piston 52 and rack 50 to the right against spring 57, thereby rotating gear 49 in a counterclockwise direction, causing pinion 47, lever 46, shaft 44 and lever 45 to also move in a counterclockwise direction, thereby opening the throttle 22 until the engine manifold pressure transmitted to the chamber 75 becomes sufficiently great to collapse the bellows 74 and move the servo-valve 80 toward its equilibrium position.

During operation above the direct manually controlled throttle range, the pilot, in positioning lever 58 and quadrant 48 with its cam 62 determines the load on spring 71 and therefore determines the pressure in chamber 75 which the control will automatically maintain. For example, if at a given setting of the lever 58, the charging pressure decreases as by an increase in altitude, bellows 74 will expand slightly, causing the servo-valve 80 to move to the left and increase the flow of oil to the servo chamber 53, thereby moving the piston 52 further to the right and opening the throttle an additional amount so as to maintain the relative charging operating pressure. An increase in charging pressure as by a decrease in altitude will produce the reverse effect and will cause a slight closing of the throttle.

The pilot's control or throttle lever 58, in positioning the throttle 22, also determines the carburetor inlet pressure setting by means of cam 63, and the propeller pitch governor setting by means of cam 61.

Normally, the engine-driven supercharger 16 has more than sufficient capacity to maintain the charging pressure selected by lever 58 from ground level up to some predetermined or critical altitude, the particular altitude being dependent upon the value of the pressure selected. For example, if at ground level lever 58 is placed in its mid position, the charging pressure determined by cam 62 and spring 71 will obtain in the engine manifold 18 with the throttle only partially open. If the plane now ascends, the boost control will gradually open the throttle to maintain the selected charging pressure notwithstanding the reduced atmospheric pressure; and this will continue until an altitude is attained at which the throttle is substantially wide open, or the critical altitude for the blower is attained.

Up until the time the critical altitude for the first charging step is approached or reached, the pressure applied to aneroid chamber 113 from section 12 of the intake duct 10 may be sufficient to maintain bellows 112 in a collapsed state, or it may drop to a point where the bellows will be extended by datum spring 118, depending upon the schedule of carburetor inlet pressure to be maintained with respect to intake manifold pressure. If there is no turbo or auxiliary charging pressure and if frictional losses are neglected, carburetor deck pressure would substantially equal atmospheric pressure, which would ordinarily be above scheduled carburetor inlet pressure. Under such conditions, the aneroid 112 would remain in a collapsed condition up to a certain altitude and the turbo would simply rotate at idling speed, due to the action of the limit switch 131. Such altitude may vary over a wide range, depending upon scheduled carburetor inlet or deck pressure, or there may be instances when the pressure at this point will drop to that scheduled irrespective of altitude. Preferably the datum cams and springs should be given a setting such as to produce a minimum of time lag when turbo boost is required. However, since the intake manifold pressure is controlled quickly and independently of the turbo control by the carburetor throttle and air intake datum control, the exhaust control may have a certain amount of time lag without materially affecting power output of the engine.

When the pressure in the intake section 12 of the air intake conduit 10 drops to a predetermined value, or to a point where it no longer maintains the bellows 112 in a collapsed state, switch rod 115 moves to the right, thereby bringing contact 122 into engagement with contact 124, closing the circuit from the battery to the solenoid coil of relay R¹ through wires 126a, 127, 127a, overspeed governor contacts 139, 141, wire 127b, contacts 122, 124, wires 135, 135a, limit switch L² and wire 135b; energization of the solenoid of relay R¹ causing contact 41b to engage contact 41a, whereupon a circuit is closed from the battery through wire 125, rheostat 125b, wire 125a, through the motor and coil 41, relay contacts 41b, 41a and back to the battery through wire 125c; to thereby move waste gate 34 toward closed position and accelerate the turbo to a speed where it will supply the required schedule of pressure in conjunction with the supercharger 16.

As the charging pressure at the intake manifold becomes effective, the pressure in chamber 75 will tend to rise above the value selected by datum spring 71; however, the bellows 74 and servo-valve 80 function as previously described and partially close the throttle to maintain the pressure in chamber 74 at the selected value. Upon further increase in altitude the boost control gradually opens the throttle and/or closes the turbo waste gate, and maintains the scheduled pressure up to a point where the capacity of the turbo is reached. If desired, an additional charging step or steps could be provided to increase the capacity of the system.

Should the pressure in intake section 12 rise above the scheduled value as determined by the setting of spring 118, bellows 112 collapses and rod 115 moves to the left, thereby closing contacts 121, 123, whereupon current flows from the battery through wires 126a, 127, 127c, pressure reserve switch contacts 128, 130, wire 136, contacts 121, 123, wires 134, 134a, limit switch L¹, wire 134b to solenoid coil of relay R², causing contact 42b to engage contact 42a, closing the motor circuit from the battery through wire 125, rheostat 125b, wire 125a, through the motor and coil 42, contacts 42b, 42a and back to the battery through wire 125c; causing motor 40 to reverse the drive on waste gate 34 and move the latter toward open position, thereby reducing the speed of the turbo.

The pressure reserve switch 131 functions to maintain a minimum turbo boost to insure that the turbo will continue to operate at moderate speeds even during idling or low power operation of the engine, to thereby improve acceleration and avoid power loss in overcoming inertia when turbo charging is demanded. This device maintains a minimum turbo pressure rise of, for example, 1" of mercury across the turbo driving rotor 32 by regulating the position of the waste gate 34 in a manner such that the required amount of exhaust pressure will be applied to keep the rotor operating at moderate speeds even though the engine is idling or operating at low power at which time the exhaust pressure is at a minimum, the carburetor deck pressure is above that scheduled, and the switch 120 is in a position which tends to maintain the waste gate open, viz., to the left with contacts 121 and 123 closed.

By way of example, let it be assumed that the pressure of the atmosphere in which the plane is moving at any one moment is 29.5" Hg, corresponding substantially to ground level operation; and let it further be assumed that the power control lever 58 is set for a moderate power output. Since the engine-driven supercharger 16 has sufficient capacity to maintain such selected power up to a predetermined altitude, there is no need for turbo supercharging until this altitude is approached, and consequently the turbo datum spring 118 would be sufficiently loaded through cam 63 and lever 72 so as to effect completion of the circuit through contacts 122, 124 to accomplish closing of the waste gate 34 only as this altitude is approached or exceeded. Below this altitude, however, the increased pressure on bellows 112 would collapse the bellows and close the switch contacts 121, 123 establishing a circuit as heretofore pointed out which would energize armature winding 42 and tend to fully open the waste gate. Were it not for the pressure reserve switch, the turbo would probably stop or slow up to a very low speed since the exhaust pressure effective on the turbo with the waste gate open would be insufficient to maintain the turbo operating at moderate speeds as is desired for rapid resumption of turbo charging upon subsequent rapid increase in altitude or sudden demand for increased power output.

In the event the turbo speed tends to decrease below the desired minimum value the decreased pressure in conduit 12 transmitted through pipe 133 to bellows 131a becomes insufficient to overcome spring 131c and the bellows will collapse breaking the connection between contacts 128, 130 and interrupting the circuit through contacts 121, 123 to armature winding or coil 42, thereby preventing further opening of waste gate 34 and further reduction in turbo speed. Further decrease in the differential pressure across the turbo results in further collapse of bellows 131a and a closing of contacts 128, 129 whereby a direct circuit is established from the battery through wires 126a, 127, 127c, contacts 128, 129, wires 129a, 135a limit switch L², wire 135b to solenoid coil of relay R¹, causing contact 41b to engage 41a and closing the motor circuit from the battery through the motor and coil 41, whereupon the motor moves the waste gate 34 toward closed position and increases the speed of the turbo to reestablish the minimum turbo boost pressure as determined by spring 131c. As soon as the minimum differential pressure is established the bellows 131a expands and breaks the circuit through contacts 128, 129 to stop further closing of the waste gate. Thus reserve switch 131 functions to control the waste gate to maintain at all times a minimum turbo boost and consequently a minimum turbo speed.

The turbo overspeed governor functions to maintain the turbo speed within safe limits. Thus should the turbo exceed a certain maximum, the governor operates to close contacts 139 and 140, whereupon current passes from the battery through wires 126a, 127, 127a, contacts 139, 140, wire 142, limit switch L¹, to wire 134b through solenoid coil of relay R², causing contact 42b to engage contact 42a, thereby closing the motor circuit through coil 42 and reducing the turbo speed to the maximum determined by the setting of the overspeed governor.

Figure 3:
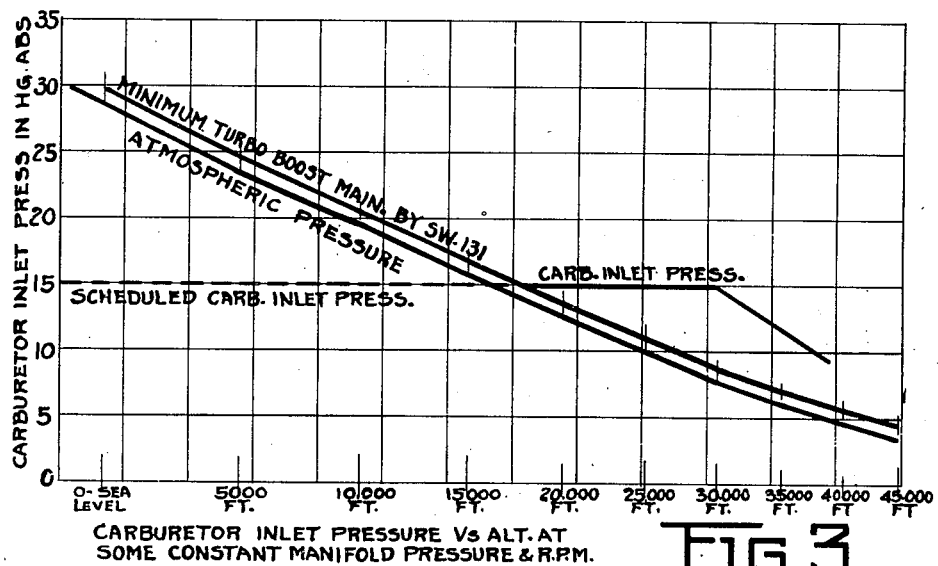
Figures 3 and 4, are curve charts illustrative of performance characteristics obtainable by the control unit of Figures 1 and 2.

The chart of Figure 3 plots carburetor inlet pressure against altitude at some constant manifold pressure and R. P. M. It will be noted that at sea level up to a certain altitude, the turbo boost closely follows atmospheric pressure, and when an altitude is reached where the required carburetor inlet pressure would otherwise drop below that scheduled, the turbo acts to maintain the required pressure. The curved line which follows the line denoting atmospheric pressure indicates the minimum boost pressure maintained by the pressure reserve switch. Theoretically, with a constant manifold pressure and engine speed, the carburetor inlet pressure follows a substantially straight line until the critical altitude for both superchargers is attained; whereas actually this line may simulate to some extent a sine wave due to the fact that it would be difficult to maintain the turbo boost at a fixed value.

Figure 4:
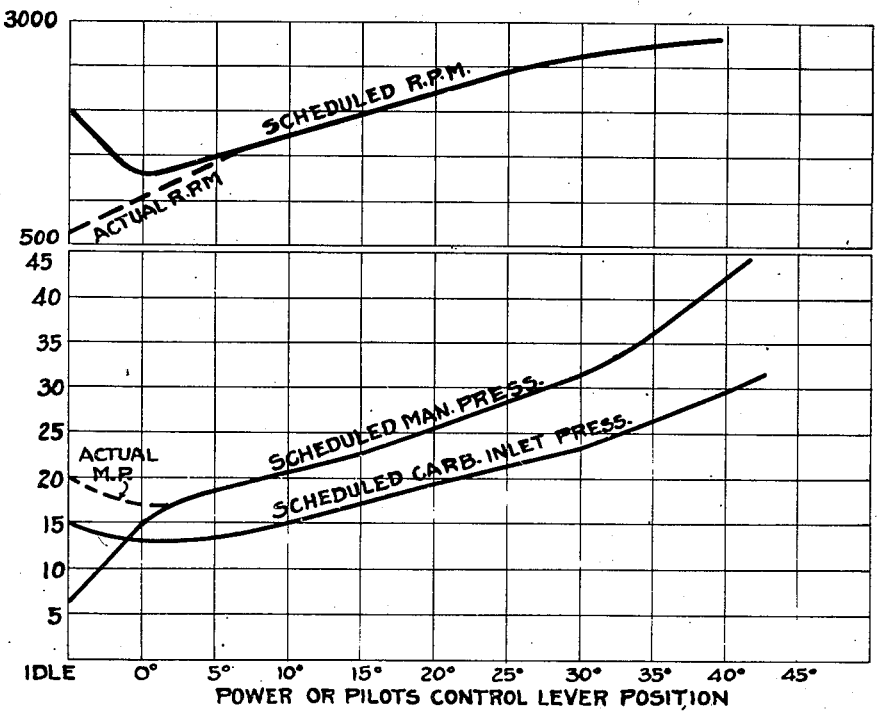

Figure 4 is a curve chart illustrating a schedule of R. P. M., manifold pressure, carburetor inlet pressure and pressure between the throttle and engine-driven supercharger vs. power. The latter might also be calibrated in degrees of control lever setting. The full lines indicate the scheduled engine speed, manifold pressure and carburetor inlet pressure, while the dotted lines indicate what is actually obtained. Thus at idling, the manifold pressure and carburetor inlet pressure are somewhat greater than that scheduled, while the R. P. M. is less than that scheduled. This is due to the fact that the engine has not yet warmed up or reached a degree of operation which will bring the respective pressures up to those scheduled. As the throttle is opened, manifold pressure rises and is followed by carburetor inlet pressure, the latter being maintained slightly above that existing between the throttle and engine-driven supercharger, so that ample pressure is available at the throttle without waste, or without utilizing power in needlessly driving the turbo.

The aneroid 112 is preferably connected into the induction conduit or passage adjacent to or in the region of the carburetor deck. This connection has certain important advantages; for instance, should there be duct losses or leaks between the turbo and the carburetor, either of an inherent nature or such as might result from enemy gun fire or other causes, the carburetor would continue to be supplied with the correct amount of air as long as the turbo capacity is not exceeded; and different installations with different duct losses may be controlled by identically calibrated control units.

It is to be understood, however, that the aneroid 112 may be influenced by pressures from any source which are representative of or function as a reference with respect to pressures prevailing in the region of the carburetor deck or in the induction passage between the turbo supercharger and the carburetor.

It will be seen that for each scheduled manifold pressure and R. P. M., a fixed value of carburetor inlet pressure and manifold pressure rise is called for by the datum controls, and if these are not obtained, the respective factors will become unbalanced and the turbo waste gate will be accelerated or retarded to establish equilibrium. To prevent hunting of the electrical controls, the contacts should be separated such distances as will permit some pressure change without changing the waste gate position. The result will be that the control of carburetor inlet pressure will not follow an exact straight line. Close manifold pressure control may be obtained by some throttling at the carburetor, which is acceptable since it tends toward a more stable control. This throttling will not occur above the critical altitude of the engine-driven supercharger, since under this condition both the manifold pressure and carburetor inlet pressure will be lower than the control will call for, and therefore the throttle will be wide open and the turbo will overspeed unless controlled by the overspeed governor.

Figure 5:
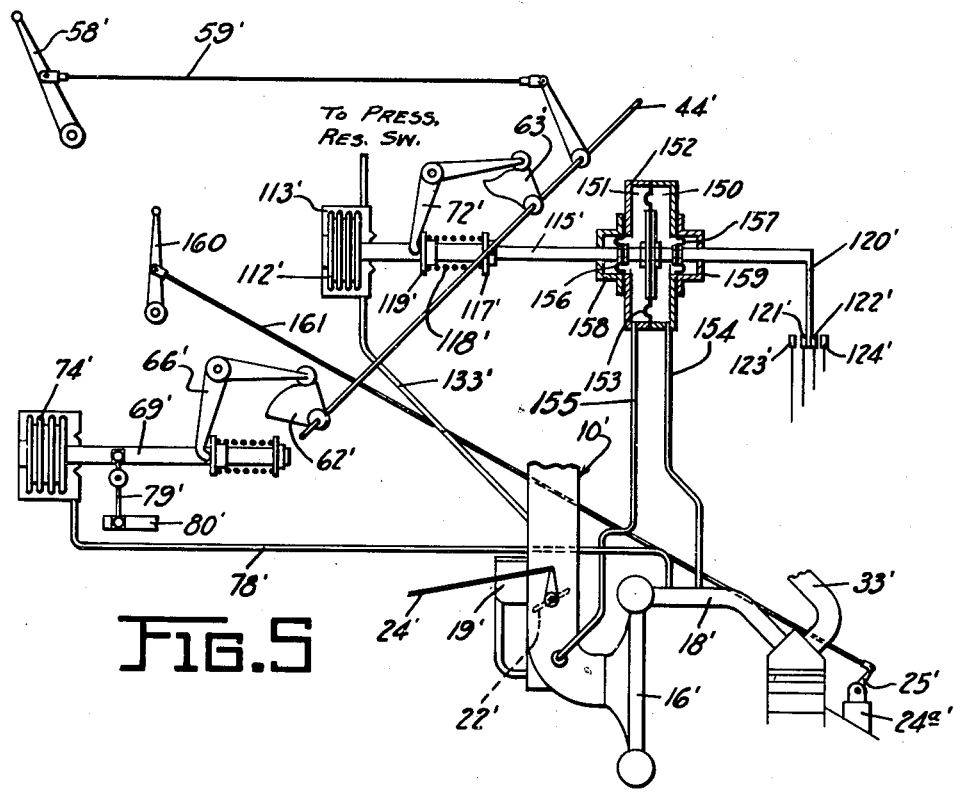
Figure 5 is a view similar to Figure 1 of a modification.

Figure 5 illustrates a turbo control unit of modified construction with respect to that shown in Figures 1 and 2, wherein the engine speed may be varied independently of the power control lever setting and wherein the carburetor inlet pressure maintained by the turbo supercharger depends not only upon the setting of the power control lever, as in the device of Figure 1, but also upon the operating speed of the engine.

In Figure 5, parts which correspond in function to those of Figures 1 and 2 are given like reference numerals except that a prime (') has been added. Intake manifold pressure and posterior throttle pressure, (pressure which exists between the throttle and the engine-driven supercharger), are communicated, respectively, to chambers 150 and 151 defined by housing 152 partitioned by a diaphragm 153, chamber 150 having pressure communication with the intake manifold 18' by means of tube or pipe 154, and chamber 151 having pressure communication with the conduit 10' between the throttle 22' and the supercharger 16' by means of pipe or tube 155. Rod 115' projects through the housing 152 and is secured to the diaphragm 153 and consequently is movable therewith. To ensure against leakage, sealing diaphragms 156 and 157 are secured at their centers to the shaft or rod 115' on opposite sides of the main diaphragm 153, the said sealing diaphragms being anchored at their outer edges by means of journal boxes 158 and 159. The rod 115' carries datum spring 118' which at one end abuts adjustable collar 117' fixed to said rod and at its opposite end abuts slidable collar 119', the latter being engaged by bell crank lever 72' acted on by datum cam 63' secured on shaft 44'.

Carburetor inlet pressure is communicated to chamber 113' by means of tube or pipe 133', said chamber having therein bellows 112' which at its free or movable end is connected to the left-hand end of rod 115'.

The right-hand end of rod 115' carries switch contacts 121' and 122' adapted to engage contacts 123' and 124', which contacts correspond to the contacts 121, 122, 123 and 124 of Figures 1 and 2, the electrical circuit associated with these contacts being the same as that heretofore described and operating in the same manner. Thus when the rod 115' moves to the right and contact 122' engages contact 124', the waste gate is moved towards closed position to thereby increase the speed of the turbo, and when said rod moves to the left and contact 121' engages 123', the waste gate is moved towards open position and the turbo speed decreased.

The propeller pitch governor 24a' is provided with a separate manual control by means of lever 160 and connecting link 161; while the datum cam 63' on shaft 44' together with datum cam 62' act automatically to maintain correlated manifold pressure and carburetor inlet pressure in accordance with the setting of power-control lever 58'.

In operation, the pressures communicated to the chambers 150 and 151 are indicative of those existing in the intake manifold 18' and in the conduit 10' between the throttle and the supercharger, the latter pressure being termed "posterior throttle pressure." Since intake manifold pressure is normally higher than that between the throttle and the supercharger 16', the tendency will be for the diaphragm 153 to urge the rod 115' to the left, which movement is opposed by the datum spring 118'; and likewise carburetor inlet pressure in chamber 113' normally urges the bellows 112' towards collapsed position against the resistance of datum spring 118'. The force of datum spring 118' as variably determined by the setting of the power control lever 58', and cam 63' is balanced against the sum of the forces obtained from carburetor inlet pressure acting on bellows 112' and the pressure rise across the engine-driven supercharger 16' acting on diaphragm 153. By having the supercharger pressure rise assist the carburetor inlet pressure to balance the datum force, variation of carburetor inlet pressure will be obtained as the engine speed and consequently the supercharger pressure rise is varied at any scheduled manifold pressure.

As an aid to a clear understanding of the examples of operation which follow, it may be noted that the absolute manifold pressure as determined by the setting of cam 62' is equal to the absolute atmospheric pressure plus the rise in pressure through the turbo-supercharger minus the pressure drop or throttling loss across the carburetor, plus the rise in pressure across the engine-driven supercharger; and obviously any drop in the engine-driven supercharger pressure rise as results with decrease in speed must be compensated for by an increase in the turbo-supercharger pressure rise, or by a decrease in the throttling loss of the carburetor if the scheduled manifold pressure is to be maintained.

Assume now, for example, that an airplane equipped with the control is operating at an altitude which calls for turbo operation to maintain the scheduled carburetor inlet pressure, and the pilot decreases the speed for economical cruising operation while maintaining the scheduled manifold pressure as determined by cam 62'. This may be done by the independent control afforded by lever 160, but a decrease in the engine speed results in a decrease in the engine-driven supercharger pressure rise and will necessitate either a decrease in throttling loss as by further opening of the throttle or an increase in the pressure rise through the turbo supercharger if the scheduled manifold pressure is to be maintained. Accomplishing this merely by opening the throttle is disadvantageous for the reason that the throttle would soon reach wide open position thus using up the latter portion of the throttle opening range which preferably should be reserved to the pilot for rapid acceleration if desired and found necessary. Also, in view of the somewhat unsteady operation of a turbo-supercharger, it is desirable to reserve the latter portion of the throttle opening range so that the boost control may function to variably position the throttle so as to maintain a constant manifold pressure even though the turbo surges or otherwise varies in operation. These difficulties are avoided by the device of Figure 5 wherein a decrease in engine supercharger pressure rise accompanying a decrease in engine speed results in a drop in the pressure differential across diaphragm 153. This effects movement of rod 115' to the right closing contacts 122' and 124' and closing the blast gate, which in turn increases the speed of the turbo until the increase in carburetor inlet pressure acting on bellows 112' compensates for the loss in force on diaphragm 153 and moves the rod 115' back to its equilibrium position. The increase in pressure rise across the turbo supercharger thus at least partially compensates for the decrease in pressure rise through the engine supercharger and makes it possible to maintain the scheduled manifold pressure.

Preferably the effective area of diaphragm 153 (as reduced by the area of one or the other of sealing diaphragms 156, 157) is equal to that of the bellows 112' so that a decrease in the engine supercharger pressure rise acting on diaphragm 153 will produce an equal increase in pressure in the carburetor inlet acting on bellows 112' and consequently an equal turbo-supercharger pressure rise which will fully compensate for the decreased pressure rise across the engine-driven supercharger, whereby the throttling loss reserved for the purposes above discussed will remain constant with variation in engine speed at a scheduled manifold pressure. By making diaphragm 153 larger in area than bellows 112', a given drop in pressure rise across the engine-driven supercharger will produce a greater increase in the pressure rise across the turbo supercharger and consequently the throttling loss will have to be increased (by closing the throttle) to maintain the selected manifold pressure. Likewise if diaphragm 153 were smaller in area than bellows 112, a given drop in the pressure rise across the engine-driven supercharger would result in a smaller increase in pressure rise across the turbo-supercharger and consequently the throttling loss would have to be decreased (by opening the throttle) in order that the scheduled manifold pressure be maintained.

It will thus be seen that by making the effective area of diaphragm 153 larger, equal to or smaller than that of bellows 112', the control will produce an increasing, constant, or decreasing throttling loss respectively at any scheduled manifold pressure upon decrease in engine speed and a decreasing, constant, or increasing throttle loss respectively upon increase in speed.

Let it now be assumed that the pilot is operating at some given or fixed power setting, and that he desires to increase his speed while maintaining scheduled intake manifold or charging pressure. Lever 160 may then be further actuated in the proper direction (as shown toward the left) to obtain the desired speed, whereupon there will be a rise in pressure across the engine-driven supercharger and a corresponding rise in differential across diaphragm 153 which immediately effects movement of rod 115' to the left, closing contacts 121' and 123' and opening the blast gate which in turn decreases the speed of the turbo. Rise in pressure across the engine-driven supercharger must be compensated for either by an increase in throttling loss or by a reduction in the rise across the turbo supercharger. With the control of Figures 1 and 2 where carburetor inlet pressure is maintained at a value as determined by datum cam 63, this compensation is accomplished by an increase in throttling loss; whereas with the control of Figure 5, compensation is obtained by a decrease in the pressure rise across the turbo supercharger, it being noted however that in the event the rise across the turbo supercharger is reduced to the minimum permitted by pressure reserve switch 131 (Figure 1) without full compensation for the increased rise across the engine-driven supercharger, such deficiency in compensation will be made up by an increase in throttling loss.

Figure 6:
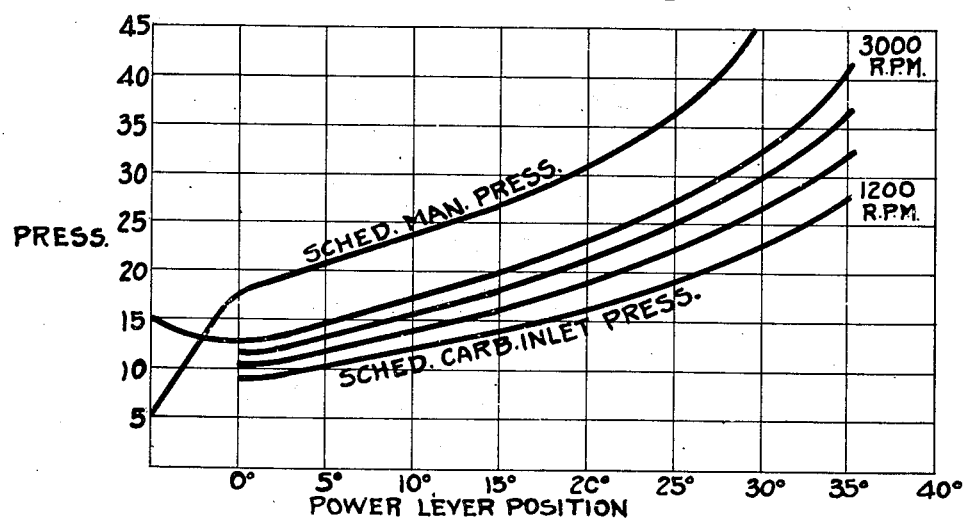
Figure 6 is a curve chart illustrative of performance characteristics obtainable by the unit of Figure 5.

Figure 6 illustrates by means of curves how the carburetor inlet pressure varies in relation to engine speed with variations in power lever settings.

The foregoing specific examples of operation should not be construed as encompassing the entire field of advantages of which the control unit is capable, nor should they be considered the more important advantages, since various types of power units and operating conditions continually present a multiplicity of problems which the improved control unit may solve or assist in solving.

The control unit of Figure 5 may also be arranged for scheduling carburetor inlet pressure, manifold pressure and engine speed or R. P. M. with a manual override for speed, in which event the cam 61 and coacting linkage of Figures 1 and 2 would be substituted for the full manual speed control lever 160 of Figure 5.

Although the invention has been described with reference to a particular embodiment, it will be understood that changes in design and arrangement of parts may be adopted without departing from the spirit and scope of the invention as defined by the appended claims.

We claim:

1. Control mechanism for an aircraft engine having an air induction passage provided with a carburetor having a throttle-controlled air inlet and a supercharging system including a primary supercharger and an auxiliary turbo supercharger in series therewith and powered by an exhaust-driven turbine; said mechanism comprising variable datum control means for said superchargers including an element responsive to pressures in said passage posterior to the primary supercharger and having means coacting therewith operating to automatically regulate the degree of charging pressure of the latter and another element responsive to pressures representative of induction pressures in said induction passage between said turbo supercharger and said throttle and having means coacting therewith operating to automatically regulate the exhaust pressure utilized in driving said turbine, a device adjustable to vary the speed of the engine independently of the throttle, and means having an operative connection with said variable datum controls and said device whereby said controls and device may be set to maintain a predetermined schedule of manifold pressure, carburetor inlet pressure and engine R. P. M.

2. Control mechanism for an aircraft engine having an intake manifold, an exhaust conduit and an air induction passage provided with a carburetor having a throttle-controlled air inlet and a supercharging system including a primary supercharger and an auxiliary turbo supercharger in series therewith and powered by an exhaust-driven turbine; said mechanism comprising a variable datum control for the primary supercharger including a pressure-responsive element having pressure communication with said passage posterior to the primary supercharger and means coacting with said element operating to automatically regulate the degree of charging pressure applied to said manifold, a variable datum control for said turbo-supercharger including a pressure-responsive element having pressure communication with said induction passage between said turbo supercharger and said throttle and means coacting with said latter element operating to automatically regulate the degree of exhaust pressure utilized in driving said turbine, and means having a common operative connection with said variable datum controls whereby the latter may be simultaneously set to automatically maintain a predetermined schedule of manifold pressure and carburetor inlet pressure.

3. Control mechanism for an aircraft engine having a throttle-controlled induction passage provided with a carburetor inlet, intake and exhaust manifolds and a supercharging system including a primary supercharger and an auxiliary turbo supercharger in series therewith and powered by an exhaust-driven turbine; said mechanism comprising a variable datum control for the primary supercharger including a pressure-responsive element having pressure communication with said intake manifold and means coacting with said element operating to automatically regulate the degree of charging pressure applied to said manifold, a variable datum control for said turbo-supercharger including a pressure-responsive element having pressure communication with a source functioning as a reference with respect to carburetor inlet pressure and means coacting with said latter element operating to automatically regulate the degree of exhaust pressure utilized in driving said turbine, a device adjustable to vary the speed of the engine independently of the throttle, and means having a common operative connection with said variable datum controls and said device whereby said controls and device may be set to maintain a predetermined schedule of manifold pressure, carburetor inlet pressure and engine R. P. M.

4. Control mechanism for an aircraft engine having a throttle-controlled induction passage provided with a carburetor inlet located anterior the throttle and a supercharging system including a primary supercharger and an auxiliary turbo supercharger in series therewith and powered by an exhaust-driven turbine; said mechanism comprising variable datum control means for said superchargers including a pressure-responsive element in pressure communication with said passage posterior to the primary supercharger and having means coacting therewith operating to automatically regulate the degree of charging pressure of the latter and another pressure-responsive element in pressure communication with a source of pressure representative of carburetor inlet pressures and having means coacting therewith operating to automatically regulate the degree of exhaust pressure utilized in driving said turbine, a device adjustable to vary engine speed, a pilot's control lever, means controllable by said lever having an operative connection with said variable datum control means and said device whereby the control means and device may be set within a certain range of movement of the lever to automatically maintain a predetermined schedule of manifold pressure, carburetor inlet pressure and engine R. P. M. and means whereby the automatic speed control may be overridden and the engine speed controlled independently of said variable datum control.

5. Control mechanism for an aircraft engine having a throttle-controlled induction passage provided with a carburetor inlet located anterior the throttle, an intake manifold and a supercharging system including a primary supercharger and a secondary supercharger arranged in series with the first-named supercharger; said mechanism comprising a variable datum control for automatically regulating the charging pressures of said superchargers including a spring-loaded pressure-responsive element having pressure communication with said manifold and another spring-loaded pressure-responsive element having pressure communication with a source representative of carburetor inlet pressures, a shaft, cams mounted on said shaft and coordinated to variably load the springs of said elements and automatically provide a predetermined schedule of manifold pressure and carburetor inlet pressure, a throttle lever, and means connecting the throttle lever with said shaft.

6. Control mechanism for an aircraft engine having a throttle induction passage provided with a carburetor inlet located anterior the throttle, an intake manifold and a supercharging system including a primary supercharger and a secondary supercharger arranged in series therewith; said mechanism comprising a variable datum control including a spring-loaded pressure-responsive element having pressure communication with said intake manifold and operating to automatically regulate the degree of charging pressure and another spring-loaded pressure-responsive element having pressure communication with a source representative of carburetor inlet pressures for regulating the secondary supercharger, a device adjustable to vary the speed of the engine independently of the throttle, a shaft, cams mounted on said shaft and coordinated to variably load the springs of said elements and regulate said device to automatically maintain a predetermined schedule of manifold pressure, carburetor inlet pressure and engine R. P. M., a throttle lever, and means connecting the throttle lever with said shaft.

7. Control mechanism for an aircraft engine having a throttle controlled induction passage provided with a carburetor inlet located anterior the throttle, a supercharger driven in relation to the speed of the engine and a turbo supercharger arranged in series therewith and powered by an exhaust-driven turbine; said mechanism comprising a variable datum control including an element responsive to charging pressures for regulating the throttle to thereby regulate the degree of charging pressure of the engine-driven supercharger, another variable datum control for regulating the degree of exhaust pressure utilized in driving the turbine including an element responsive to pressures having as a reference carburetor inlet pressures, and means having an operative connection with the throttle for simultaneously setting said control means in predetermined coordinated relation whereby a predetermined schedule of intake manifold pressure and carburetor inlet pressure is obtained for each position of the throttle.

8. Control mechanism for an aircraft engine having an exhaust conduit, a throttle-controlled induction passage provided with a carburetor inlet located anterior the throttle and a supercharging system including a primary supercharger and an auxiliary turbo supercharger powered by an exhaust-driven turbine; said mechanism comprising a variable datum control unit for said primary supercharger including a pressure-responsive element having pressure communication with the induction passage posterior to the primary supercharger and a datum spring for variably loading said element, a blast gate for applying exhaust pressure to driving the turbine, an exhaust datum control for said turbo supercharger including a pressure-responsive element in pressure communication with the induction passage anterior the carburetor inlet and having an operative connection with said blast gate to regulate the degree of charging pressure applied to the induction conduit anterior to the throttle and a spring for variably loading said element, a shaft, cams mounted on said shaft and having an operative connection with said springs for variably loading the latter, a throttle lever, and means connecting said throttle lever with said shaft.

9. Control mechanism for an aircraft engine having induction and exhaust conduits and a fuel-feeding system including a carburetor, said induction conduit including a carburetor air inlet portion and an intake manifold portion, a supercharger arranged to discharge air under pressure into the intake manifold portion and a turbo supercharger arranged to discharge air under pressure into said passage anterior to the carburetor inlet portion and powered by an exhaust-driven turbine; said mechanism comprising means for regulating the exhaust pressure applied to driving the turbine, control means for said superchargers including an element responsive to pressures in said manifold portion and another element responsive to pressures prevailing in the region of the carburetor inlet, variable datum means manually regulable to give a predetermined simultaneous coordinated setting to said elements, and means operatively connecting said second-named element with said exhaust pressure regulating means for automatically controlling the speed of the turbine.

10. Control mechanism for an aircraft engine having an induction passage provided with a throttle-controlled carburetor air inlet portion and an intake manifold portion, a supercharger located to discharge into said manifold portion and another supercharger arranged to discharge into said carburetor inlet portion; said control mechanism including pressure-responsive means having pressure communication, respectively, with said intake manifold portion posterior to the said first-named supercharger and with said carburetor inlet portion anterior the throttle and posterior to said second-named supercharger, and variable datum means arranged to give a predetermined simultaneous coordinated setting to said pressure-responsive means and coordinate the operation of said superchargers to maintain a predetermined schedule of carburetor inlet pressure and intake manifold pressure.

11. Control mechanism for an aircraft engine having an exhaust passage provided with a blast gate, a throttle controlled induction passage and a supercharging system including a primary supercharger driven in relation to the speed of the engine and an auxiliary turbo supercharger powered by an exhaust-driven turbine; said mechanism comprising a variable datum control for regulating the degree of charging pressure of said primary supercharger including an element responsive to charging pressures posterior to the throttle, another variable datum control for said turbo supercharger including a pressure-responsive element having pressure communication with a source representative of pressures prevailing in said passages anterior the throttle, electric means operable to position the blast gate and thereby control the degree of exhaust used in driving the turbine, a source of electric power such as a battery, an electric circuit connecting said source with said gate positioning means, a switch interposed in said circuit and influenced by said second-named element to close the circuit to the gate positioning means when turbo supercharger pressure is required to maintain the pressure in said induction passage at a value determined by the setting of said second-named variable datum control.

12. In a control for an internal combustion engine having an exhaust manifold and a throttle controlled induction conduit provided with a carburetor inlet portion anterior the throttle and a multi-step supercharger system including a mechanically-driven supercharger located posterior to the throttle and a turbo supercharger located anterior to the throttle and powered by an exhaust-driven turbine, said turbine having a driving rotor located to receive exhaust gases from said exhaust manifold, an exhaust gate and electrical means for variably positioning said gate to thereby regulate the exhaust pressure applied to said rotor, variable datum means for controlling the charging pressures of said superchargers including a pressure-responsive element having pressure communication with the induction conduit posterior to the throttle and another pressure-responsive element having pressure communication with said conduit anterior to the carburetor inlet, a switch operatively connected to one of said elements, and electrical means connecting said switch with said blast gate positioning means.

13. In a control for an internal combustion engine having an exhaust conduit and a supercharging system including a turbo supercharger powered by a turbine provided with a driving rotor subjected to exhaust pressure, a blast gate associated with said exhaust conduit, an exhaust datum control for said supercharger, electrical means for positioning the blast gate to thereby control the degree of exhaust pressure used in driving the turbine, a source of electric power such as a battery, an electric circuit connecting said source with said gate positioning means, a switch interposed in said circuit and influenced by said exhaust datum control to close the circuit to the gate positioning means when charging pressure drops below or exceeds a value determined by said control, and switch means in said circuit operating to maintain the speed of the turbo within minimum and maximum lmits.

14. In a control for an aircraft engine having an induction conduit and an exhaust conduit, a super-charging system including a turbo supercharger arranged to discharge into said induction conduit and powered by an exhaust-driven turbine provided with a rotor arranged to receive gases from said exhaust conduit and a movable gate for said exhaust conduit; an electric motor for variably positioning said gate to thereby regulate the exhaust pressure utilized in driving said rotor, variable datum means for controlling the charging pressure including a pressure-responsive element having pressure communication with a source representative of pressures prevailing in said conduits, a contact switch controlled by said element, an electric circuit operatively connecting said switch to said motor, and another contact switch in said circuit responsive to turbine speed and arranged to break the circuit to said motor when the turbine attains a predetermined speed.

15. In a control for an aircraft engine having a throttle controlled intake passage and an exhaust manifold, a supercharging system including a turbo supercharger powered by a turbine provided with a driving rotor arranged to receive gases from said exhaust manifold and a blast gate located in said exhaust manifold for regulating the pressure applied to said rotor; an electric motor for variably positioning said gate, variable datum control means for said supercharger, an electric circuit connecting said control means to said motor, another electric current and means interposed in said latter circuit operating through said motor to move the blast gate to a position effective to maintain the turbine in a state of rotation during idling and low-power speeds of the engine.

16. In a control for an aircraft engine having an intake passage and an exhaust conduit, a supercharging system including a primary supercharger and an auxiliary turbo supercharger in series therewith powered by a turbine having a driving rotor located to receive exhaust gases from said exhaust conduit and a movable blast gate coacting with said conduit; variable datum control means for said superchargers having an operative connection with said blast gate for automatically positioning the latter to produce a turbo charging pressure in accordance with the demands of the control, and means effective to move the blast gate toward closed position independently of said control means when the engine is throttled to idle and low-power speeds.

17. In a control for an aircraft engine having an intake passage and an exhaust conduit, a supercharging system for the engine including a turbo supercharger arranged to supply pressure to said engine and powered by a turbine having a driving rotor located to receive exhaust gases from said exhaust conduit and a movable blast gate located in said conduit; means for variably positioning said gate to thereby control the exhaust pressure utilized in driving said rotor including variable datum control means for said supercharger having an operative connection with said gate positioning means, and means responsive to a function of the engine limiting the closing position of said gate independently of sad control means to thereby maintain the turbine in a state of rotation when the variable datum control would otherwise permit the turbo to stall.

18. In a control for an aircraft engine having an induction passage and an exhaust conduit, a supercharging system including a turbo supercharger arranged to deliver air under pressure to said engine and powered by a turbine having a driving rotor located to receive exhaust gases from said conduit and means for controlling the exhaust applied to said rotor; a variable datum control including a pressure-responsive element having pressure communication with said passage and operatively connected to said exhaust control means, and means responsive to a function of the engine for maintaining the turbo supercharger at a minimum turbo boost during idling and low engine speeds independently of said variable datum control.

19. In a control for an aircraft engine having an induction passage and an exhaust conduit, a supercharging system including a turbo supercharger arranged to deliver pressure to said induction passage and powered by a turbine having a driving rotor located to receive exhaust gases from said exhaust conduit and a movable blast gate for regulating the degree of exhaust pressure applied to said rotor; electrical means for positioning said gate, variable datum means for varying the degree of charging pressure including a pressure-responsive element movable in relation to pressures prevailing in said passage, a source of electric power, an electrical circuit operatively connecting said source with said gate-positioning means, a switch interposed in said circuit and controllable by said element to regulate the position of the gate in accordance with charging pressure, and means for maintaining a minimum turbine speed during low and idling speeds of the engine including a device having an element responsive to a differential in pressure between atmospheric and that prevailing in said passage and a switch controlled by said element adapted to close the circuit between the source of power and gate-positioning means when the differential attains a predetermined value.

20. In a control for an aircraft engine having an induction passage and an exhaust manifold, a supercharging system including a turbo supercharger arranged to deliver pressure to said induction passage and powered by a turbine having a driving rotor located to receive exhaust gases from said exhaust manifold and a movable blast gate; an electric motor for variably positioning said gate to regulate the degree of exhaust pressure applied to said rotor, means for automatically regulating the speed of the turbine including a pressure-responsive element having pressure communication with a source representative of the pressures prevailing in said passage, an electric circuit operatively connecting said element with said motor to variably position said gate in accordance with demands of the engine, and means for maintaining a minimum turbo boost at times when the engine is at idling and low power speed including an expansible bellows having pressure communication with the atmosphere and with said passage and a switch interposed in said circuit and influenced by said bellows in a manner such that when the pressure in said passage drops below atmospheric said circuit is closed and said motor driven independently of said exhaust datum control in a direction to move the gate toward closed position.

21. In a control for an aircraft engine having an intake passage and an exhaust conduit, a supercharging system including a turbo supercharger powered by a turbine having a driving rotor located to receive pressure from said exhaust conduit and a blast gate coacting with said conduit; variable datum means for automatically controlling the exhaust utilized in driving the turbine, a motor for variably positioning said gate, an electric circuit operatively connecting said variable datum means with said motor, a maximum speed switch in said circuit, a centrifugal governor controlling said switch, said governor being operatively connected to said turbine and arranged to open said switch when the turbo attains a predetermined maximum speed.

22. In combination with an internal combustion engine having an induction passage, a pair of superchargers in series relation in said passage, and means responsive to the differential in pressure across one of said superchargers for controlling the operation of the other of said superchargers.

23. In combination with an internal combustion engine having an induction passage, a pair of superchargers in series relation in said passage, and means jointly responsive to the pressure rise across one of said superchargers and to the pressure at the outlet of the other of said superchargers for controlling the operation of one of said superchargers.

24. In combination with an internal combustion engine having an induction passage including a carburetor, an exhaust gas driven supercharger in said passage anterior to the carburetor, means responsive to the pressure at the carburetor inlet for controlling the operation of said supercharger, and means responsive to pressures varying with variations in engine speed for modifying said control.

25. In combination with an internal combustion engine having an induction passage, a supercharging system including a main blower and an auxiliary blower arranged to supply air under pressure to the engine through said passage, means responsive to variations in charging pressures for regulating the pressure rise across one of said blowers, and means responsive to variations in engine speed for regulating the pressure rise across the other of said blowers.

26. In combination with an internal combustion engine having an induction passage, a supercharging system including a main blower and an auxiliary blower arranged to supply air under pressure to the engine through said passage, a variable datum control including means for regulating the pressure rise across the main blower to maintain a predetermined charging pressure, and means responsive to variations in pressure rise across the main blower for regulating the operation of the auxiliary blower.

27. In combination with an internal combustion engine having an induction passage including an intake manifold, a supercharging system including an engine-driven supercharger and a turbo supercharger arranged to supply air under pressure to the engine through said passage and powered by an exhaust-driven turbine, means for automatically regulating the pressure rise across the engine-driven supercharger to maintain a schedule of manifold pressure, and means for varying the pressure rise across the turbo supercharger, said latter means being responsive to a function of the speed of the engine-driven supercharger.

28. In combination with an internal combustion engine having a throttle-controlled induction passage, a supercharging system including an engine-driven supercharger and a turbo supercharger powered by an exhaust-driven turbine, power control means including means for automatically positioning the throttle to maintain a predetermined scheduled charging pressure, and means automatically operating as a function of engine speed for regulating the speed of the turbo supercharger to maintain a pressure schedule anterior the throttle such as will permit scheduled charging pressure with a minimum of throttle loss.

29. In combination with an internal combustion engine having a throttle-controlled induction passage including a carburetor inlet anterior the throttle and an intake manifold posterior the throttle, and an exhaust conduit provided with a movable turbine blast gate; a supercharging system including an engine-driven supercharger providing a first supercharging stage and a turbo supercharger constituting an auxiliary or second stage and powered by an exhaust-driven turbine, variable datum means functioning to variably position the throttle to maintain scheduled manifold pressure, and means influenced by carburetor inlet pressure and the pressure rise across the engine-driven supercharger having an operative connection with the blast gate whereby a schedule of carburetor inlet pressure is obtained such as will maintain scheduled manifold pressure with a minimum of throttle loss.

30. In combination with an internal combustion engine having a throttle-controlled induction passage including a carburetor or inlet anterior the throttle and an intake manifold posterior the throttle, and an exhaust conduit provided with a movable turbine blast gate; a supercharging system including an engine-driven supercharger providing a first supercharging stage and an exhaust-driven turbo supercharger providing an auxiliary or second stage, variable datum means functioning to variably position the throttle to maintain scheduled charging pressure, means responsive to carburetor inlet pressure and a coordinated differential in pressures prevailing between the throttle and engine-driven supercharger and in the intake manifold, and means operatively connecting said latter means to the blast gate to regulate the speed of the turbo in accordance with scheduled manifold pressures and carburetor inlet pressures.

31. In an airplane powered by an internal combustion engine having an induction passage provided with a carburetor inlet and an exhaust conduit provided with a movable blast gate, a supercharging system including an engine-driven primary supercharger and a secondary turbo supercharger in series therewith, said turbo supercharger being driven by a turbine whose speed of rotation is governed by the position of the blast gate, and means for variably positioning said gate including means responsive to variations in carburetor inlet pressure and engine-driven supercharger pressure.

32. In an internal combustion engine having an intake passage provided with a throttle and an exhaust system, a supercharger operatively associated with said intake passage and adapted to be driven by exhaust gas pressure from said exhaust system, a blast gate for controlling the pressure of the exhaust gases which operate said supercharger, and variable-datum means for regulating the position of said gate including a movable member having an operative connection with said gate and pressure-differential responsive means for actuating said member having pressure communication with said passage anterior and posterior to the throttle.

33. In an internal combustion engine having a throttle-controlled intake passage with a carburetor inlet and an exhaust system, an engine-driven supercharger operatively associated with said intake passage posterior the carburetor inlet and throttle, a turbo supercharger operatively associated with said passage anterior the carburetor inlet and adapted to be driven by exhaust gas pressure from said exhaust system, a blast gate for controlling the pressure of the exhaust gases which operate the turbo supercharger, and variable datum means for regulating the position of said gate including a movable member having an operative connection with the gate and pressure-differential responsive means for actuating said member utilizing operating pressures having as a reference source carburetor inlet pressure and the differential resulting from pressures between the throttle and engine-driven supercharger and posterior said latter supercharger.

34. In combination with an internal combustion engine having a throttle-controlled induction passage including a carburetor inlet anterior the throttle and an intake manifold posterior the throttle, and an exhaust conduit provided with a movable turbine blast gate; a supercharging system including an engine-driven supercharger providing a first supercharging stage and an exhaust-driven turbo supercharger providing an auxiliary or second stage, a variable-datum power control including an element responsive to manifold pressure for variably positioning the throttle to maintain scheduled charging pressures and another element responsive to carburetor inlet pressure and provided with an operating member having an operative connection with the blast gate to maintain a schedule of carburetor inlet pressures, a device responsive to pressure rise across the engine-driven supercharger coordinated with said latter element for joint control of said operating member, and means for regulating the speed of the engine independently of said power control.

35. The combination of claim 34, wherein said device consists of a diaphragm connected to said element and subjected on one side to pressures prevailing between the throttle and engine-driven supercharger and on the opposite side to pressures prevailing in the intake manifold.

FRANK C. MOCK.
JAY A. BOLT.

REFERENCES CITED

The following references are of record in the file of this patent:

UNITED STATES PATENTS

| Number | Name | Date |
|---|---|---|
| 1,557,793 | Berger et al. | Oct. 20, 1925 |
| 2,024,202 | Berger | Dec. 17, 1935 |
| 2,285,344 | Marples et al. | June 2, 1942 |
| 2,297,235 | Müller | Sept. 29, 1942 |
| 2,305,810 | Müller | Dec. 22, 1942 |
| 2,336,844 | Buck | Dec. 14, 1943 |
| 2,355,759 | Stokes | Aug. 15, 1944 |
| 2,373,139 | Morris | Apr. 10, 1945 |
| 2,376,142 | Hoffman et al. | May 15, 1945 |
| 2,428,531 | Schorn | Oct. 7, 1947 |

FOREIGN PATENTS

| Number | Country | Date |
|---|---|---|
| 479,278 | Great Britain | Jan. 28, 1938 |
| 684,902 | France | Mar. 24, 1930 |

Certificate of Correction

Patent No. 2,480,758 August 30, 1949

FRANK C. MOCK ET AL.

It is hereby certified that errors appear in the printed specification of the above numbered patent requiring correction as follows:

Column 5, line 17, for "otherwies" read *otherwise*; line 58, for the word "supercharge" read *supercharger*; column 7, line 60, for "relay $R^2$" read *relay $R^1$*; column 18, line 72, after "throttle" insert *controlled*; column 20, line 23, after "said", second occurrence, strike out "control"; line 26, after "to" strike out "the"; column 21, line 31, for "lmits" read *limits*; lines 64 and 65, for "current" read *circuit*; column 22, line 26, for "sad" read *said*; column 24, line 65, strike out "or";

and that the said Letters Patent should be read with these corrections therein that the same may conform to the record of the case in the Patent Office.

Signed and sealed this 21st day of February, A. D. 1950.

[SEAL]

THOMAS F. MURPHY,
*Assistant Commissioner of Patents.*